Patented July 5, 1938

2,122,735

UNITED STATES PATENT OFFICE 2,122,735

MANUFACTURE OF MANGANESE DIOXIDE

Alfred Félix Sébastien Bellone, Lyon, France, assignor to Societe des Usines Chimiques Rhone-Poulenc, Paris, France No Drawing. Application January 10, 1935, Serial No. 1,158. In Great Britain January 12, 1934

7 Claims. (Cl. 23—145)

The present invention relates to the production of manganese dioxide by the oxidation of manganese compounds.

According to the Weldon process, it is known to regenerate manganese dioxide from manganese salts by precipitating manganese hydrate with lime and then oxidizing this hydrate by air in the presence of an excess of lime, the dioxide being recovered in the form of calcium manganite.

Meyer and Nerlich (Ztschr. f. anorg. Ch. 1921, 116, p. 118 et seq.) have studied the oxidation of manganous hydrate in an ammoniacal medium by air under atmospheric pressure. By ascertaining the amount of active oxygen in the precipitate obtained, they have confirmed the results of the Weldon process in an alkaline earth medium. In a soda or potash medium, however, they have found that for concentrated solutions the results are very variable and correspond to a lower degree of oxidation than that of $MnO_2$. Furthermore the products contain more or less combined alkali. In an ammoniacal medium, the precipitate had the composition of manganic hydroxide $(Mn(OH)_3)$.

I have found that under certain conditions the oxidation of manganous hydrate in an ammoniacal medium by means of air or a gas rich in oxygen can be caused to lead to the precipitation of very rich artificial oxide of manganese with an oxygen content far higher than that of manganic hydroxide, i. e., containing a large proportion of manganese dioxide. The necessary condition for this result is that the pressure of the oxygen should be greater than the partial pressure of this element in ordinary atmospheric air.

The process according to the present invention, therefore, consists in causing manganous hydrate to react in an ammoniacal medium with air under pressure or with pure oxygen either at normal pressure or at increased pressure. The manganous hydrate in an ammoniacal medium to be used according to the present invention is most generally obtained by using the reaction product obtained by allowing an excess of ammonia to react on a manganous salt such as a chloride or a sulphate obtained in the acid treatment of manganese ores. The ammonium salt formed by the reaction does not in any way impede the oxidation; it is even advantageous to introduce an excess thereof into the reaction medium.

In order to carry out the invention in practice, relatively weak pressures of air or oxygen can be used, as even a pressure of air amounting to 1.5 kg. per sq. cm. enables a product to be obtained in 12 hours in which 76% of the manganese in the manganese oxide produced is in the form of dioxide, but the speed of oxidation diminishes more and more rapidly as the degree of oxidation becomes more and more increased. Such diminution in the rate of oxidation however, becomes less as the pressure is greater. It is therefore preferable technically to employ greater pressures of air or of oxygen, for example, pressures of 5 to 25 kgs. per sq. cm. in the case of air, or corresponding oxygen pressures of up to 5 kgs. per sq. cm.

In the practice of my invention I use air or oxygen under such pressure that the partial pressure of the oxygen is greater than 0.30 kg. per sq. cm.

It is advantageous to carry out the oxidation in the presence of certain elements such as copper or chromium, or their derivatives, or of certain organic bodies such as hydroquinone, which exert a favourable action on the oxidation.

The precipitate obtained by this reaction is an oxidation product of manganese, free from impurities and containing the manganese chiefly in the form of manganese dioxide $(MnO_2)$ with a small proportion of manganese oxide (MnO). This product thus obtained furnishes an artificial manganese dioxide which is very active both for use in oxidation reactions and as a galvanic element. By treatment with a suitable reagent (as, for example, dilute sulphuric acid), practically the whole of the manganous oxide can be dissolved out so as to leave as undissolved residue a practically pure and very active dioxide.

The following examples, without being limitative, illustrate how the invention may be carried out in practice:

*Example 1.*—In a closed apparatus, furnished with a suitable stirrer, 2 litres of an aqueous solution containing 2 gram molecules of manganous sulphate, 2 gram molecules of ammonium sulphate and 2 grams of copper sulphate, are introduced. Into this stirred solution 6 gram molecules of ammonia are introduced and then immediately oxygen is introduced at a rate in proportion to its absorption. At the end of 24 hours a precipitate containing all the manganese introduced is separated; this precipitate contains 80% of the manganese in the state of the dioxide.

*Example 2.*—In an autoclave capable of being stirred or otherwise agitated, are introduced 10 litres of an aqueous solution of manganous sulphate containing 1 gram molecule per litre, and 28 gram molecules of ammonia. 10 grams of potassium bichromate in aqueous solution are then added. Oxygen under a pressure of 3 kgs. per sq. cm. is then introduced into the autoclave which is stirred for 4 hours. The precipitate obtained is separated by simple filtration; 90% of the manganese contained in this product is found to be in the state of dioxide.

*Example 3.*—In the same apparatus containing a similar charge, air is introduced under a pressure of 15 kgs. per sq. cm. After stirring for several hours a precipitate is obtained of which 82% of the manganese is in the state of the dioxide. By treating this product with dilute sulphuric acid a practically pure manganese dioxide is obtained.

*Example 4.*—In a closed apparatus, fitted with a suitable stirring gear, there are introduced 2 litres of an aqueous solution containing 2 gram molecules of manganous sulphate and 80 gram molecules of ammonium sulphate. Into the stirred solution 5.6 gram molecules of ammonia are introduced and absorbed and then oxygen is introduced, maintaining a pressure of 1 kg. per sq. cm. At the end of 24 hours the precipitate which contains all the manganese which has been introduced, is separated off. This precipitate contains 81% of the manganese in the state of dioxide.

What I claim and desire to secure by Letters Patent is:—

1. A process for the preparation of artificial oxide of manganese containing a large proportion of manganese dioxide, consisting in oxidizing manganous hydroxide in an aqueous ammoniacal solution by means of one of that group of substances including oxygen in a pure state and oxygen diluted with an inert gas under such a pressure that the partial pressure of the oxygen is greater than 0.30 kg. per sq. cm.

2. A process for the preparation of artificial oxide of manganese containing a large proportion of manganese dioxide, consisting in oxidizing the reaction product formed by an excess of aqueous ammonia solution and a manganese salt by means of one of that group of substances including oxygen in a pure state and oxygen diluted with an inert gas under such a pressure that the partial pressure of the oxygen is greater than 0.30 kg. per sq. cm.

3. A process for the preparation of artificial oxide of manganese containing a large proportion of manganese dioxide, consisting in oxidizing manganous hydroxide in an aqueous ammoniacal solution in which an ammonium salt is also present by means of one of that group of substances including oxygen in a pure state and oxygen diluted with an inert gas under such a pressure that the partial pressure of the oxygen is greater than 0.30 kg. per sq. cm.

4. A process for the preparation of artificial oxide of manganese containing a large proportion of manganese dioxide, consisting in oxidizing manganous hydroxide in an ammoniacal medium in which hydroquinone is present, by means of one of that group of substances including oxygen in a pure state and oxygen diluted with an inert gas under such a pressure that the partial pressure of the oxygen is greater than that of oxygen in atmospheric air.

5. A process for the preparation of artificial oxide of manganese containing a large proportion of manganese dioxide consisting in oxidizing manganous hydroxide in an ammoniacal medium in which a copper salt is present, by means of oxygen either in the pure state or diluted with an inert gas under such a pressure that the partial pressure of the oxygen is greater than 0.3 kg. per sq. cm.

6. A process for the preparation of artificial oxide of manganese containing a large proportion of manganese dioxide consisting in oxidizing manganous hydroxide in an ammoniacal medium in which a chromate is present, by means of oxygen either in the pure state or diluted with an inert gas under such a pressure that the partial pressure of the oxygen is greater than 0.3 kg. per sq. cm.

7. A process for the preparation of artificial oxide of manganese containing a large proportion of manganese dioxide, which consists in oxidizing manganeze hydroxide in an ammoniacal medium in the presence of a catalyst of the group consisting of hydroquinone, a copper salt and a chromate, by means of one of the group comprising oxygen in a pure state and oxygen diluted by an inert gas, the oxidizing being effected under such pressure that the partial pressure of the oxygen is greater than that of oxygen in atmospheric air.

ALFRED FÉLIX SÉBASTIEN BELLONE.